United States Patent
Zhang et al.

(10) Patent No.: US 8,970,981 B2
(45) Date of Patent: Mar. 3, 2015

(54) HARDWARE SUPPORT OF SERVO FORMAT WITH TWO PREAMBLE FIELDS

(71) Applicant: LSI Corporation, San Jose, CA (US)

(72) Inventors: Xun Zhang, Westford, MA (US); Haitao Xia, San Jose, CA (US); Dahua Qin, Allentown, PA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/851,734

(22) Filed: Mar. 27, 2013

(65) Prior Publication Data

US 2014/0268397 A1    Sep. 18, 2014

Related U.S. Application Data

(60) Provisional application No. 61/788,271, filed on Mar. 15, 2013.

(51) Int. Cl.
| | | |
|---|---|---|
| *G11B 5/584* | (2006.01) | |
| *G11B 5/596* | (2006.01) | |
| *G11B 27/30* | (2006.01) | |

(52) U.S. Cl.
CPC ........ *G11B 5/59688* (2013.01); *G11B 27/3027* (2013.01)
USPC .............................. 360/75; 360/48; 360/77.08

(58) Field of Classification Search
CPC .......... G11B 5/00; G11B 5/58; G11B 5/5534; G11B 5/5543; G11B 5/56; G11B 5/59633; G11B 5/59655; G11B 5/59688
USPC .......................... 360/39, 40, 48, 55, 77.08, 75
See application file for complete search history.

(56) References Cited

U.S. PATENT DOCUMENTS

| | | | |
|---|---|---|---|
| 6,618,452 B1 | 9/2003 | Huber et al. | |
| 7,023,631 B2 * | 4/2006 | Zhang et al. | 360/29 |
| 7,199,956 B1 * | 4/2007 | Moser et al. | 360/46 |
| 7,280,295 B2 | 10/2007 | Dati et al. | |
| 7,292,402 B2 * | 11/2007 | Ehrlich et al. | 360/75 |
| 7,312,946 B2 * | 12/2007 | Asakura et al. | 360/77.06 |
| 7,333,290 B1 * | 2/2008 | Kupferman | 360/77.08 |
| 7,746,594 B1 * | 6/2010 | Guo et al. | 360/77.05 |
| 2006/0152845 A1 * | 7/2006 | Asakura et al. | 360/77.08 |
| 2009/0225741 A1 | 9/2009 | Wang et al. | |
| 2010/0054379 A1 * | 3/2010 | Eymann et al. | 375/344 |
| 2010/0128386 A1 * | 5/2010 | Keizer et al. | 360/77.07 |
| 2011/0310507 A1 * | 12/2011 | Yoshida et al. | 360/77.05 |
| 2012/0063024 A1 * | 3/2012 | Mathew et al. | 360/55 |

FOREIGN PATENT DOCUMENTS

EP     1482699     2/2005

\* cited by examiner

*Primary Examiner* — Thomas Alunkal
(74) *Attorney, Agent, or Firm* — Suiter Swantz pc llo

(57) ABSTRACT

A hard disk drive uses a second, reference burst field in a preamble to estimate burst phase and burst magnitude. Such estimations are used for position error signal integration and repeatable runout correction. Gain error is also derived from such estimations. Information contained in a preamble field is used in conjunction with the reference burst phase estimation to synchronize servo address marks.

20 Claims, 3 Drawing Sheets

HARDWARE SUPPORT OF SERVO FORMAT WITH TWO PREAMBLE FIELDS

PRIORITY

The present application claims the benefit under 35 U.S.C. §119(e) of U.S. Provisional Application Ser. No. 61/788,271, filed Mar. 15, 2013, which is incorporated herein by reference.

BACKGROUND OF THE INVENTION

In hard disk drive systems, performance during null burst demodulation is sensitive to phase and gain error. As drive density increases, preamble lengths need to get shorter. Preamble length is a critical factor in such performance. Lower burst frequencies, such as half or ⅔ of the preamble frequency, are used to achieve higher local signal-to-noise ratios and more stable burst demodulation performance. Such low rate bursts are less sensitivity to phase error; however, this property cannot be used to reduce the total length of the preamble because a long preamble is still needed for gain estimation. Furthermore, a gain loop runs at the existing preamble field frequency, which is different from the bursts frequency. The amplitude of the burst cannot be controlled directly, which creates problems like analog-to-digital converter saturation and a need for additional normalization at the drive level.

Consequently, it would be advantageous if an apparatus existed that is suitable for using preamble fields with lower frequency for gain error calculations and repeatable runout error correction.

SUMMARY OF THE INVENTION

Accordingly, the present invention is directed to a novel method and apparatus for using preamble fields with lower burst frequency for gain error calculations and repeatable runout error correction.

One embodiment of the present invention is an architecture for utilizing preamble with plurality of preamble fields, so as to achieve more stable position error signal demodulation performance. The first preamble field is written as a non-return-non-return-to-zero pattern stream of [0011] before the servo address mark field, and second preamble field is written as the non-return-to-zero pattern stream of or [000111] after the Gray code and right before the position error signal field. In this architecture, a traditional preamble field is only used to estimate phase information servo address mark/Gray code detection, while the second preamble field is used to estimate the phase and gain information for the position error signal burst Due to the lower rate of the second preamble field compared to the preamble field, local signal-to-noise ratio is higher, thus the loop noise is lower, which in turn, results more stable position error signal burst demodulation performance.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
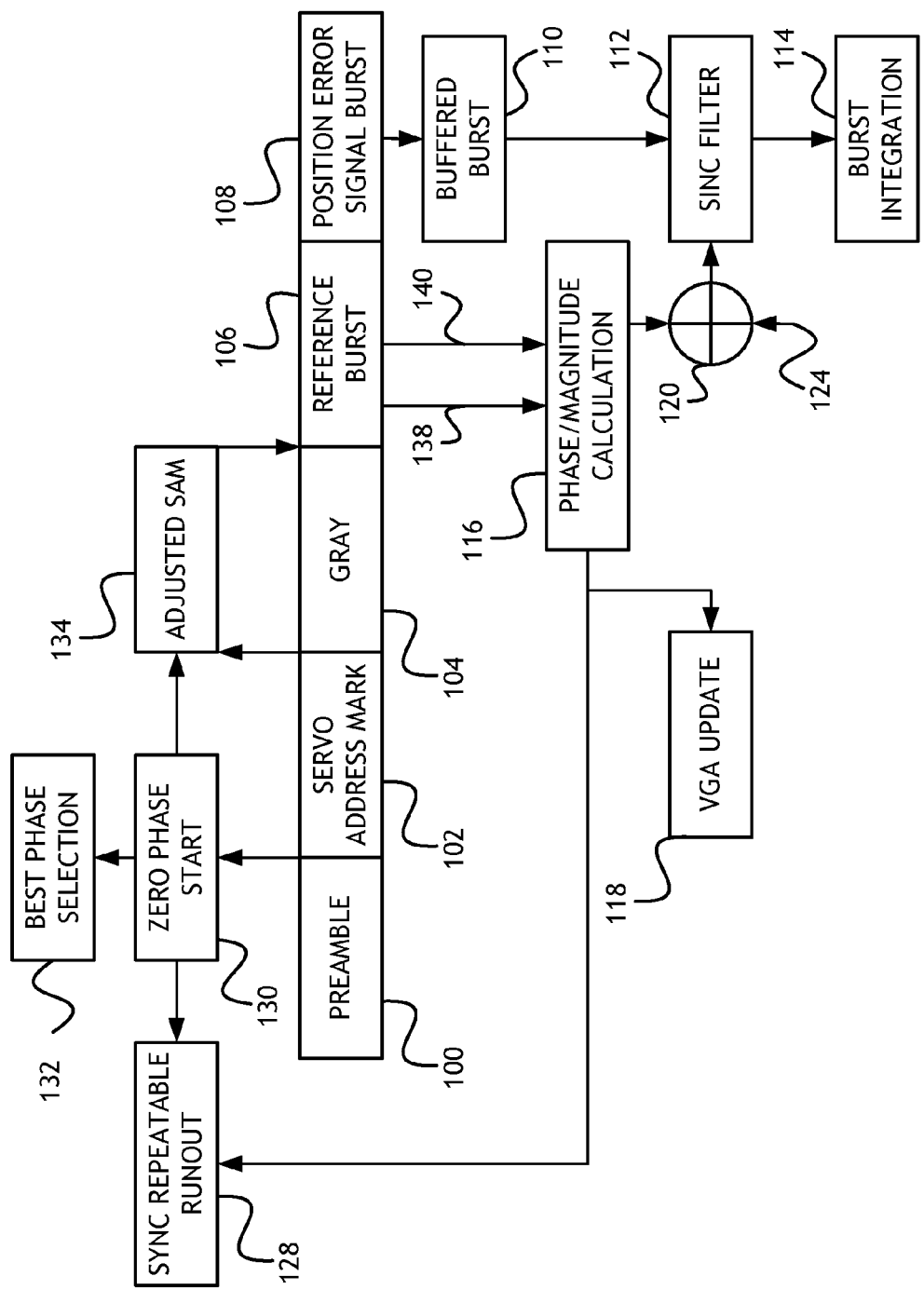
FIG. 1 shows a block diagram of an apparatus for utilizing two preamble fields according to at least one embodiment of the present invention.

Referring to FIG. 1, a block diagram of an apparatus for utilizing two preamble fields according to at least one embodiment of the present invention is shown. In a hard disk drive system, an initial signal includes a plurality of fields. The plurality of fields includes a traditional preamble 100, a servo address mark 102 and Gray code 104. The plurality of fields also includes a reference burst 106 operating at the same frequency as a position error signal burst 108. The reference burst 106 includes a sine component 138 and a cosine component 140 that are used to estimate the phase and magnitude of the reference burst 106. Because the reference burst is the same frequency as the position error signal burst 108, using the reference burst 106 to estimate the phase for the position error signal burst 108 removes the requirement for a linear phase analog front end. System architecture is thereby simplified. Furthermore, the reference burst 106 peak value is directly controllable.

Regarding the traditional preamble 100; the preamble is only used for phase estimation to begin servo address mark 102 and Gray code 104 detection, which is less sensitive to analog front end settling behavior than burst demodulation. Because the traditional preamble 100 is only used for phase estimation, servo processing can start earlier after switching from read mode to servo mode, which reduces the length of the traditional preamble 100.

The traditional preamble 100 is only used for zero phase start 130 calculation, which is used derive the best phase selection 132 for starting servo address mark 102 detection, update disk lock clock, and to derive the phase adjusted "servo address mark found" 134 signal for use by a position error signal burst integration element 114 to determine a repeatable runout value. The traditional preamble 100 is used to estimate a phase for servo address mark 102 detection. Using the traditional preamble 100 for phase estimation maintains the resolution necessary for a worst-case 2T pattern in the servo address mark 102 and Gray code 104 fields.

Regarding the reference burst 106; the reference burst 106 is used as source for phase, gain and DC offset estimations for the position error signal burst The sine component 138 and cosine component 140 of the reference burst 106 are to do zero phase start estimation. In at least one embodiment, the reference burst can be either a 3T (000111) or 4T (00001111) pattern. In at least one embodiment, reference burst 106 is the same rate as the position error signal burst 108. In at least one embodiment, the reference burst 105 is an extended Gray code 104 field, written phase coherent manner with the first field and written on track. The reference burst 104 is a special burst; burst integration for the reference burst 104 is analogous to integration for the position error signal burst 108.

A phase magnitude calculator 116 performs calculations to derive burst phase estimation and magnitude estimation. In at least one embodiment of the present invention, the burst phase estimation calculation includes calculating the arctangent of the sine component 138 divided by the cosine component 140. In at least one embodiment of the present invention, the magnitude estimation calculation includes calculating the square root of the sine component 138 squared plus the cosine component 140 squared.

In at least one embodiment of the present invention, the burst phase is estimation is performed using data taken immediately in front of the position error signal burst 108. Data from such location produces burst demodulation performance that is less sensitive to frequency drift occurring during the servo address mark 102 and Gray code 104 fields.

In at least one embodiment, the burst magnitude estimation is sent to a variable gain amplifier signal updater 118; and the burst phase estimation is sent to a sync repeatable runout processing element 128. The variable gain amplifier signal updater 118 updates a variable gain amplifier used to regulate a gain control circuit. The sync repeatable runout processing element 118 utilizes the burst phase information to direct the writing and reading of the repeatable runout signal field.

In at least one embodiment of the present invention, the burst phase estimation is sent to a digital sinc filter 112 to interpolate the position error signal to the ideal phase. In one embodiment, the digital sinc filter 112 also receives position error signal bursts from a buffered position error signal burst 110 memory element so that the phase calculation does not consume format. In at least one embodiment, the position error signal burst integration element 114 operates in a window derived from the servo address mark 102, and a relative distance from the Gray code 104 field is predicted based on the frequency and the required non-return-to-zero pattern of the reference burst 106.

The magnitude and zero gain start estimation are used to estimate a gain error by comparing those values to a defined target. Because of the lower preamble rate and the higher local signal-to-noise ratio of the reference burst 106, the gain estimation signal-to-noise ratio can be two to three dB higher compared to prior art devices.

In at least one embodiment of the present invention, the reference burst 106 supports flawscan. An interpolator is used to track positive and negative peaks of the reference burst 106. Each peak is compared to a defined threshold to determine if there is a flaw.

In at least one embodiment of the present invention, while in a search mode, the traditional preamble 100 is used for gain estimation. Because the gain loop is driven by the reference burst 106, gain estimation only happens if a servo address mark 102 is found. If there is a large gain error, servo address marks 102 may be missing and the gain error can never be corrected. Using the traditional preamble 100 for gain estimation, servo address marks 102 are detected and the gain re-estimated once detection occurs.

Burst demodulation filter gain should be taken into account when deriving gain error. Gain varies with channel bit density, and therefore can be designated by a user.

Figure 2:
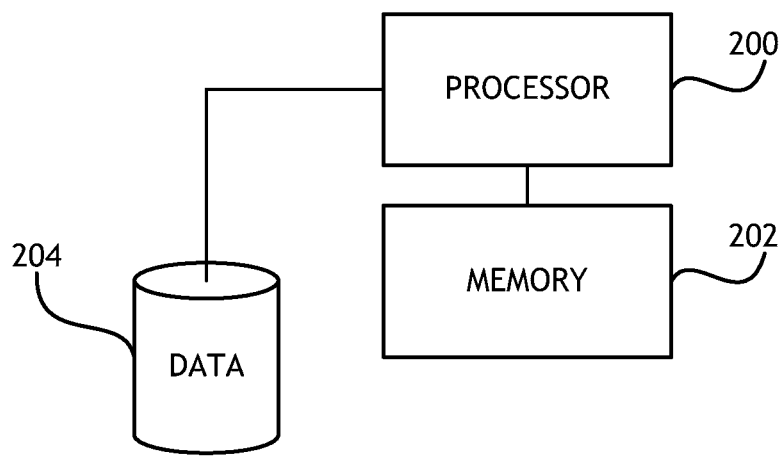
FIG. 2 shows a block diagram of a system useful for implementing at least one embodiment of the present invention.

Referring to FIG. 2, a block diagram of a system useful for implementing least one embodiment of the present invention is shown. In one embodiment of the present invention, a processor 200 is connected to a memory 202. The memory 202 stores computer executable program code for reading a data stream from a data element 204. The data stream includes at a plurality of fields. The plurality of fields includes a traditional preamble, a servo address mark and Gray code. The plurality of fields also includes a reference burst and a position error signal burst with the same frequency as the reference burst, half to two thirds of the first field frequency.

The processor 200 is configured to calculate a zero phase start and select a best phase base on the traditional preamble of the first field. The processor 200 is also configured to calculate a burst phase estimation and burst magnitude estimation based on the reference burst of the second field. In at least one embodiment, the burst magnitude estimation are used to determine a gain error. In at least one embodiment, the burst phase estimation is used to assist the processing of repeatable runout field.

The processor 200 is also configured to adjust the phase of the position error signal based on the reference burst phase estimation result. The processor 200 is also configured to integrate the phase adjusted position error signals after the preamble.

Figure 3:
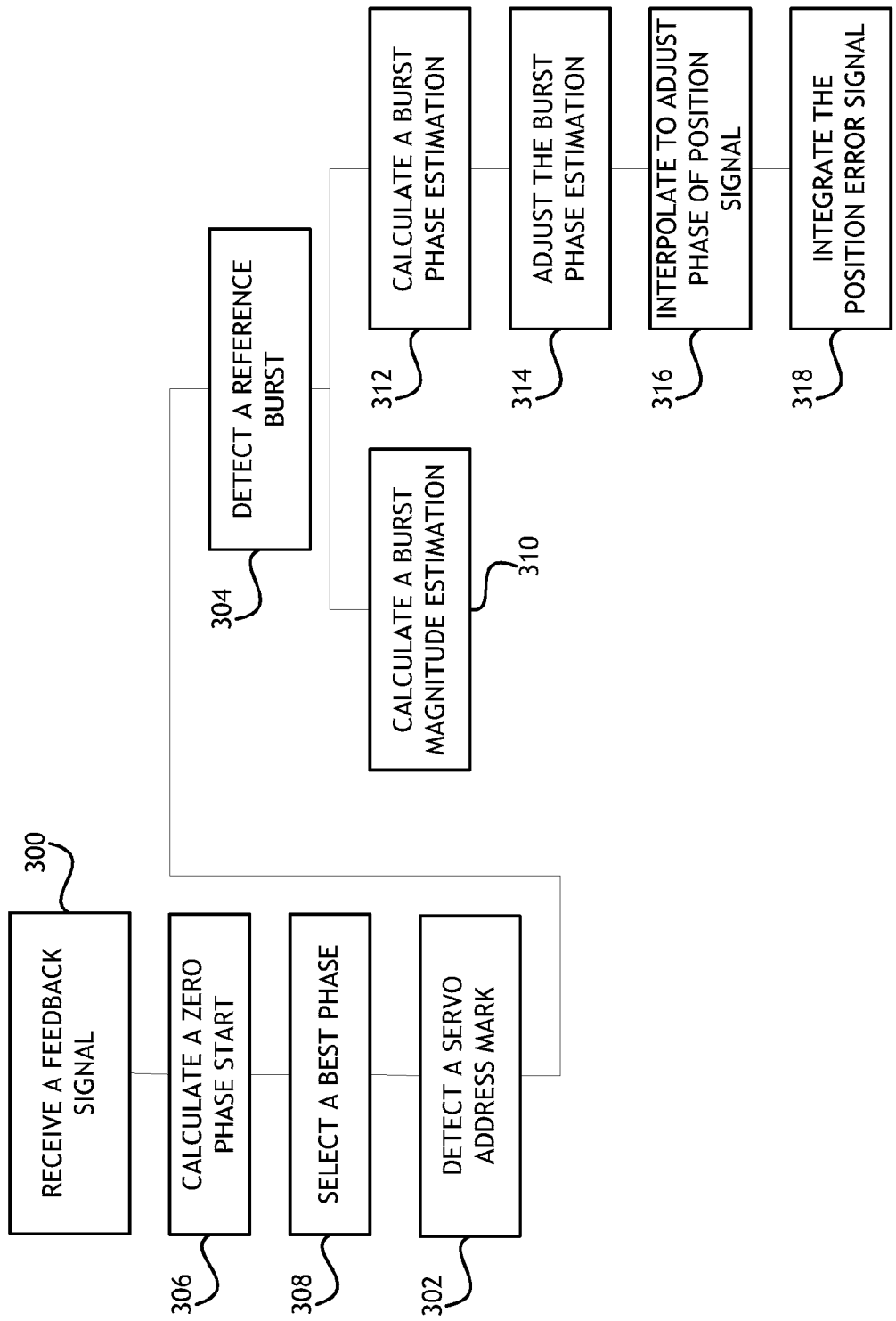
FIG. 3 shows a method for producing phase and gain information.

Referring to FIG. 3, a method for producing phase and gain information is shown. In at least one embodiment of the present invention, an initial signal includes a plurality of fields. The plurality of fields includes a traditional preamble, a servo address mark and Gray code. The plurality of fields also includes a reference burst and a position error signal burst. The traditional preamble, servo address mark and Gray code are used to detect 302 a servo mark address. Based on a traditional preamble, a zero phase start is calculated 306 and best phase selected 308.

Based on the reference burst, a burst magnitude estimation is calculated 310 and a burst phase estimation is calculated 312. In at least one embodiment, the burst phase estimation is used to define the starting phase of repeatable runout field processing.

The burst phase estimation is used to adjust the position error signal phase before burst integration is done. In at least one embodiment, buffered position error signal bursts are then integrated 318. In at least one embodiment, the burst magnitude estimation is used to estimate a gain error by comparing those values to a defined target.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:
1. A hard disk drive comprising:
a processor;
memory connected to the processor;
a storage element connected to the processor; and
computer executable program code configured to execute on the processor,
wherein the computer executable program code is configured to:
receive a data stream from the storage element, the data stream comprising:
a preamble comprising at least a first field and a second field, the second field comprising a reference burst, the preamble having a resolution for maintaining a first pattern at a first rate, the reference burst having a resolution for maintaining a second pattern at a second rate; and a position error signal burst wherein the position error signal burst and the reference burst comprise a common frequency;

calculate a burst phase estimation based on the reference burst; and calculate a burst magnitude estimation based on the reference burst.

2. The hard disk drive of claim 1, wherein the computer executable program code is further configured to buffer two or more position error signal bursts.

3. The hard disk drive of claim 2, wherein the computer executable program code is further configured to adjust the phase of the two or more buffered position error signal bursts by interpolation.

4. The hard disk drive of claim 1, wherein calculating the burst phase estimation comprises calculating an arctangent of a sine component of the reference burst divided by a cosine component of the reference burst.

5. The hard disk drive of claim 1, wherein calculating the burst magnitude estimation comprises calculating a square root of a sine component of the reference burst squared plus a cosine component of the reference burst squared.

6. The hard disk drive of claim 1, wherein the computer executable program code is further configured to adjust the burst phase estimation.

7. The hard disk drive of claim 6, wherein the computer executable program code is further configured to apply the burst phase estimation result in digital interpolation.

8. A method comprising:

receiving a data stream, the data stream comprising:

a preamble comprising at least a first field and a second field, the second field comprising a reference burst, the preamble having a resolution for maintaining a first pattern at a first rate, the reference burst having a resolution for maintaining a second pattern at a second rate; and a position error signal burst wherein the position error signal burst and the reference burst comprise a common frequency;

calculating a burst phase estimation based on the reference burst;

calculating a burst magnitude estimation based on the reference burst; and calculating a position error signal burst integration based on the burst phase estimation.

9. The method of claim 8, further comprising buffering two or more position error signal bursts.

10. The method of claim 9, further comprising adjusting the phase of the two or more buffered position error signal bursts by interpolation.

11. The method of claim 8, wherein calculating the burst phase estimation comprises calculating an arctangent of a sine component of the reference burst divided by a cosine component of the reference burst.

12. The method of claim 8, wherein calculating the burst magnitude estimation comprises calculating a square root of a sine component of the reference burst squared plus a cosine component of the reference burst squared.

13. The method of claim 8, further comprising adjusting the burst phase estimation.

14. The method of claim 8, further comprising applying the burst phase estimation result in digital interpolation.

15. A computer apparatus comprising:

a processor; and memory connected to the processor, wherein the processor is configured to:

receive a data stream, the data stream comprising:

a preamble comprising at least a first field and a second field, the second field comprising a reference burst, the preamble having a resolution for maintaining a first pattern at a first rate, the reference burst having a resolution for maintaining a second pattern at a second rate; and a position error signal burst wherein the position error signal burst and the reference burst comprise a common frequency;

calculate a burst phase estimation based on the reference burst;

calculate a burst magnitude estimation based on the reference burst; and calculating a position error signal burst integration based on the burst phase estimation.

16. The computer apparatus of claim 15, wherein the processor is further configured to start the repeatable runout error processing based on the reference burst phase estimation.

17. The computer apparatus of claim 15, wherein the processor is further configured to:

calculate zero phase start based on the first field of the data stream; and select a best phase.

18. The computer apparatus of claim 17, wherein the processor is further configured to calculate a synchronization factor for servo address marks to correct repeatable runout error.

19. The computer apparatus of claim 15, wherein the processor is further configured to adjust the burst phase estimation.

20. The computer apparatus of claim 15, wherein the processor is further configured to apply the burst phase estimation result in digital interpolation.

* * * * *